(12) United States Patent
Schmidt et al.

(10) Patent No.: US 11,697,589 B2
(45) Date of Patent: Jul. 11, 2023

(54) COMPOSITION OF BIS(FLUOROSULFONYL)IMIDE LITHIUM SALT

(71) Applicant: Arkema France, Colombes (FR)

(72) Inventors: Grégory Schmidt, Pierre-Benite (FR); Rémy Teissier, Pierre-Benite (FR); Jean-Luc Couturier, Pierre-Benite (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 17/059,856

(22) PCT Filed: May 28, 2019

(86) PCT No.: PCT/FR2019/051244
§ 371 (c)(1),
(2) Date: Nov. 30, 2020

(87) PCT Pub. No.: WO2019/229366
PCT Pub. Date: Dec. 5, 2019

(65) Prior Publication Data
US 2021/0221685 A1 Jul. 22, 2021

(30) Foreign Application Priority Data
Jun. 1, 2018 (FR) ...................................... 1854788

(51) Int. Cl.
*C01B 21/092* (2006.01)
*H01M 10/0525* (2010.01)
*H01M 10/0568* (2010.01)

(52) U.S. Cl.
CPC ..... *C01B 21/0926* (2013.01); *H01M 10/0525* (2013.01); *H01M 10/0568* (2013.01); *H01M 2300/0005* (2013.01)

(58) Field of Classification Search
CPC .................................................. C01B 21/0926
See application file for complete search history.

(56) References Cited

U.S. PATENT DOCUMENTS

| | | | |
|---|---|---|---|
| 6,103,131 A | 8/2000 | McNeel et al. | |
| 2012/0041233 A1 | 2/2012 | Sato et al. | |
| 2013/0323155 A1 | 12/2013 | Tsubokura et al. | |
| 2013/0331609 A1 | 12/2013 | Tsubokura et al. | |
| 2014/0075746 A1 | 3/2014 | Schmidt | |
| 2015/0246812 A1 | 9/2015 | Audureau et al. | |
| 2016/0016797 A1 | 1/2016 | Maekawa et al. | |
| 2016/0308247 A1 | 10/2016 | Buisine | |
| 2017/0047607 A1 | 2/2017 | Schmidt et al. | |
| 2018/0141901 A1 | 5/2018 | Schnider et al. | |
| 2018/0370799 A1 | 12/2018 | Lim | |
| 2019/0152792 A1 | 5/2019 | Yamada et al. | |
| 2019/0292053 A1 | 9/2019 | Schmidt et al. | |
| 2021/0050625 A1* | 2/2021 | Nozaki | H01M 10/058 |
| 2021/0122634 A1 | 4/2021 | Leduc et al. | |
| 2021/0188638 A1 | 6/2021 | Leduc et al. | |
| 2021/0214219 A1 | 7/2021 | Leduc et al. | |
| 2021/0214220 A1 | 7/2021 | Schmidt et al. | |
| 2021/0214239 A1 | 7/2021 | Leduc et al. | |
| 2021/0221685 A1 | 7/2021 | Schmidt et al. | |

FOREIGN PATENT DOCUMENTS

| | | |
|---|---|---|
| AU | 1998086626 A1 | 4/1999 |
| CN | 102405189 A | 4/2012 |
| CN | 103384641 A | 11/2013 |
| CN | 103391896 A | 11/2013 |
| CN | 105121335 A | 12/2015 |
| CN | 105392736 A | 3/2016 |
| CN | 105916805 A | 8/2016 |
| CN | 107055493 A | 8/2017 |
| CN | 107635916 A | 1/2018 |
| CN | 107673319 A | 2/2018 |
| EP | 2 505 551 A1 | 10/2012 |
| EP | 2578533 A1 | 4/2013 |
| EP | 2 660 196 A1 | 11/2013 |

(Continued)

OTHER PUBLICATIONS

International Search Report (PCT/ISA/210) with translation and Written Opinion (PCT/ISA/237) dated Aug. 2, 2019, by the European Patent Office as the International Searching Authority for International Application No. PCT/FR2019/051244.

Office Action dated Jan. 13, 2022 in CN 201980037096.X, and English-language translation, The State Intellectual Property Office of People's Republic of China, Beijing, CN, 34 pages.

Xu, Panming, et al., "Practical Metal Material Analysis Method," 2nd Edition, May 2015, p. 435, ISBN 978-7-312-02800-7, China University of Science and Technology Press, CN (3 pages).

Beijing Architectural Decoration Industry Association, et al, "Quality Inspection and Evaluation Manual of Advanced Building Decoration Engineering," Oct. 1998, p. 12, ISBN 7-112-03505-8, China Architecture & Building Press, CN (3 pages).

Lian, Peisheng, "Atomic Energy Industry," May 2002, p. 330, ISBN 7-5022-2453-X, Atomic Energy Press, CN (3 pages).

(Continued)

*Primary Examiner* — William D Young
(74) *Attorney, Agent, or Firm* — Buchanan Ingersoll & Rooney P.C.

(57) ABSTRACT

A composition containing: at least 99.75% by weight of bis(fluorosulfonyl)imide lithium salt; and acetic acid in a content by mass greater than 0 and less than or equal to 400 ppm. A process for preparing the composition, including a) step of preconcentrating a composition C1 including an organic solvent OS1, water and bis(fluorosulfonyl)imide salt, to give a composition C2 including: the lithium salt of bis(fluorosulfonyl)imide in a content ranging from 35% to 50% relative to the total weight of composition C2; water in a mass content of less than or equal to 500 ppm relative to the total mass of composition C2; said preconcentration step being performed at a temperature of less than or equal to 50° C.; b) a step of concentrating composition C2; c) an optional step of crystallizing the composition obtained in step b).

21 Claims, No Drawings

(56) References Cited

FOREIGN PATENT DOCUMENTS

| KR | 101718292 B1 | 3/2017 |
|---|---|---|
| WO | 2009123328 A1 | 10/2009 |
| WO | WO 2014/080120 A1 | 5/2014 |
| WO | 2015012897 A1 | 1/2015 |
| WO | WO 2015/082532 A1 | 6/2015 |
| WO | WO 2015/158979 A1 | 10/2015 |
| WO | 2016177765 A1 | 11/2016 |
| WO | 2017090877 A1 | 6/2017 |
| WO | WO 2017/204225 A1 | 11/2017 |
| WO | 2018104675 A1 | 6/2018 |
| WO | WO 2019/224470 A1 | 11/2019 |

OTHER PUBLICATIONS

U.S. Appl. No. 17/057,302, Philippe Leduc, Grégory Schmidt, Dominique Deur-Bert (Cited herein as US Patent Application Publication No. 2021/0188638 A1 of Jun. 24, 2021), filed Nov. 20, 2020.

U.S. Appl. No. 17/058,725, Philippe Leduc, Grégory Schmidt, Dominique Deur-Bert (Cited herein as US Patent Application Publication No. 2021/0214219 A1 of Jul. 15, 2021), filed Nov. 25, 2020.

U.S. Appl. No. 17/058,730, Philippe Leduc, Grégory Schmidt, Dominique Deur-Bert (Cited herein as US Patent Application Publication No. 2021/0214239 A1 of Jul. 15, 2021), filed Nov. 25, 2020.

U.S. Appl. No. 17/059,574, Grégory Schmidt, Dominique Deur-Bert, Rémy Teissier (Cited herein as US Patent Application Publication No. 2021/0214220 A1 of Jul. 15, 2021), filed Nov. 30, 2020.

International Search Report (PCT/ISA/210) and Written Opinion (PCT/ISA/237), with English-language translation, dated Sep. 17, 2019 in PCT/FR2019/051237, 17 pages, European Patent Office, Rijswijk, NL.

International Search Report (PCT/ISA/210) and Written Opinion (PCT/ISA/237), with English-language translation, dated Aug. 6, 2019 in PCT/FR2019/051238, 27 pages, European Patent Office, Rijswijk, NL.

International Search Report (PCT/ISA/210) and Written Opinion (PCT/ISA/237), with English-language translation, dated Jan. 24, 2020 in PCT/FR2019/051239, 31 pages, European Patent Office, Rijswijk, NL.

International Search Report and Written Opinion, with English-language translations, dated Oct. 9, 2019 in PCT/FR2019/051250, 21 pages, European Patent Office, Rijswijk, NL.

Han, Hong-Bo, et al., "Lithium bis(fluorosulfonyl)imide (LiFSI) as conducting salt for nonaqueous liquid electrolytes for lithium-ion batteries: Physicochemical and electrochemical properties", Journal of Power Sources, 2011 (month unknown), vol. 196, No. 7, pp. 3623-3632, Elsevier B.V, NL (ISSN: 0378-7753, XP028129764).

Marcus, "The Effectivity of Solvents as Electron Pair Donors", Journal of Solution Chemistry, vol. 13, No. 9, 1984 (month unknown), pp. 599-624.

Coutellerie-Ap., "Les Principaux Aciers Utilises en Coutellerie", Jan. 1, 2016, pp. 1-3, Retrieved from the Internet Dec. 12, 2018: http://www.coutellerie-ap.fr/liste/ (XP055533233).

Wikipedia, "Acier inoxydable", Oct. 15, 2004, pp. 1-11, Retrieved from the Internet Dec. 12, 2018: https://fr.wikipedia.org/wiki/Acier_inoxydable (XP055533223).

Wikipedia, "Hastelloy", Mar. 2, 2009, pp. 1-2, Retrieved from the Internet Dec. 12, 2018: https://fr.wikipedia.org/wiki/Hastelloy (XP055533203).

Wikipedia, "Inconel", Mar. 28, 2009, pp. 1-3, Retrieved from the Internet Dec. 12, 2018: https://fr.wikipedia.org/wiki/Inconel (XP055533228).

Office Action dated Dec. 27, 2021 in CN Application No. 201980035233.6, China National Intellectual Property Administration, Beijing, CN, and English-language translation, 18 pages.

Examination Report Under Sections 12 & 13 of the Patents Act, dated Apr. 27, 2022 in IN Application No. 202017051057, Intellectual Property India, New Delhi, IN, 6 pages.

\* cited by examiner

COMPOSITION OF BIS(FLUOROSULFONYL)IMIDE LITHIUM SALT

FIELD OF THE INVENTION

The present invention relates to a composition based on the lithium salt of bis(fluorosulfonyl)imide.

TECHNICAL BACKGROUND

By virtue of their very low basicity, anions of sulfonylimide type are increasingly used in the field of energy storage in the form of inorganic salts in batteries, or of organic salts in supercapacitors or in the field of ionic liquids. Since the battery market is in full expansion and reduction of battery manufacturing costs has become a major challenge, an inexpensive large-scale process for synthesizing anions of this type is necessary.

In the specific field of Li-ion batteries, the salt that is currently the most widely used is $LiPF_6$, but this salt has many drawbacks such as limited thermal stability, sensitivity to hydrolysis and thus lower safety of the battery. Recently, novel salts bearing the group $FSO_2^-$ have been studied and have demonstrated many advantages such as better ion conductivity and resistance to hydrolysis. One of these salts, LiFSI ($LiN(FSO_2)_2$), has shown highly advantageous properties which make it a good candidate for replacing $LiPF_6$.

The identification and quantification of impurities in salts and/or electrolytes and the understanding of their impacts on battery performance have become paramount. For example, on account of their interference with electrochemical reactions, impurities bearing a labile proton lead to reduced overall performance qualities and stability for Li-ion batteries. The application of Li-ion batteries makes it necessary to have high-purity products (minimum amount of impurities).

There is a need for novel compositions based on lithium bis(fluorosulfonyl)imide salt, for use thereof in batteries.

DESCRIPTION OF THE INVENTION

The present invention relates to a composition comprising:
- at least 99.75% by weight of the lithium salt of bis (fluorosulfonyl)imide; and
- acetic acid in a mass content strictly greater than 0 and less than or equal to 400 ppm.

The mass contents mentioned above are relative to the total weight of the composition.

In the context of the invention, the terms "lithium salt of bis(fluorosulfonyl)imide", "lithium bis(sulfonyl)imide", "LiFSI", "$LiN(FSO_2)_2$", "lithium bis(sulfonyl)imide" and "lithium bis(fluorosulfonyl)imide" are used equivalently.

In the context of the invention, the term "ppm" or "parts per million" is intended to mean ppm by weight.

Preferably, the abovementioned composition comprises at least 99.78%, preferentially at least 99.80%, advantageously at least 99.85% and more advantageously at least 99.90% by weight of lithium salt of bis(fluorosulfonyl)imide relative to the total weight of said composition. Preferably, the composition comprises at least 99.95%, preferentially at least 99.97%, advantageously at least 99.98% and more advantageously at least 99.99% by weight of lithium salt of bis(fluorosulfonyl)imide relative to the total weight of said composition.

According to one embodiment, the mass content of acetic acid in the composition is less than or equal to 350 ppm, preferentially less than or equal to 300 ppm, advantageously less than or equal to 250 ppm, even more advantageously less than or equal to 200 ppm, for example less than or equal to 150 ppm. Even more preferably, the content of acetic acid in the composition is less than or equal to 100 ppm and in particular less than or equal to 50 ppm relative to the total weight of the composition.

According to one embodiment, the mass content of acetic acid in the composition is greater than or equal to 0.1 ppm, preferentially greater than or equal to 1 ppm, advantageously greater than or equal to 10 ppm, relative to the total weight of the composition.

According to one embodiment, the mass content of acetic acid in the composition ranges from 0.1 ppm to 300 ppm, preferably from 0.1 ppm to 200 ppm, advantageously from 0.1 ppm to 150 ppm, even more advantageously from 0.1 ppm to 100 ppm relative to the total weight of the composition.

The abovementioned composition may also comprise:
- a content of $Cl^-$ ions of less than or equal to 20 ppm by weight, preferably less than or equal to 15 ppm, advantageously less than or equal to 10 ppm by weight relative to the total weight of said composition; and/or
- a content of $F^-$ of less than or equal to 200 ppm, preferably less than or equal to 50 ppm, advantageously less than or equal to 30 ppm by weight relative to the total weight of said composition; and/or
- a content of $H_2O$ of less than or equal to 200 ppm, preferably less than or equal to 100 ppm, advantageously less than or equal to 50 ppm, even more advantageously less than or equal to 30 ppm by weight relative to the total weight of said composition; and/or
- a content of $SO_4^{2-}$ of less than or equal to 300 ppm, preferably less than or equal to 200 ppm, advantageously less than or equal to 100 ppm, even more advantageously less than or equal to 50 ppm by weight relative to the total weight of said composition; and/or
- a content of $Na^+$ of less than or equal to 200 ppm, preferably less than or equal to 100 ppm, advantageously less than or equal to 50 ppm, even more advantageously less than or equal to 20 ppm by weight relative to the total weight of said composition; and/or
- a content of $FSO_3Li$ of less than or equal to 500 ppm, preferably less than or equal to 300 ppm, advantageously less than or equal to 200 ppm, even more advantageously less than or equal to 100 ppm and in particular less than or equal to 20 ppm by weight relative to the total weight of said composition; and/or
- a content of $FSO_2NH_2$ of less than or equal to 200 ppm, preferably less than or equal to 100 ppm, advantageously less than or equal to 50 ppm, even more advantageously less than or equal to 20 ppm and in particular less than or equal to 10 ppm by weight relative to the total weight of said composition.

According to one embodiment, the composition comprises:
- $Cl^-$ ions in a content ranging from 0 to 20 ppm by weight, preferably from 0 to 15 ppm and even more advantageously from 0 to 10 ppm by weight relative to the total weight of said composition; and/or
- a content of $F^-$ ranging from 0 to 200 ppm, preferably ranging from 0 to 50 ppm and advantageously ranging from 0 to 30 ppm by weight relative to the total weight of said composition; and/or
- a content of $H_2O$ ranging from 0 to 200 ppm, preferably ranging from 0 to 100 ppm, advantageously ranging from 0 to 50 ppm, even more advantageously ranging from 0 to 30 ppm by weight relative to the total weight of said composition; and/or a content of $SO_4^{2-}$ ranging from 0 to 300 ppm, preferably ranging from 0 to 200 ppm, advantageously ranging from 0 to 100 ppm, even more advantageously ranging from 0 to 50 ppm by weight relative to the total weight of said composition; and/or a content of $Na^+$ ranging from 0 to 200 ppm, preferably ranging from 0 to 100 ppm, advantageously ranging from 0 to 50 ppm and even more advantageously ranging from 0 to 20 ppm by weight relative to the total weight of said composition; and/or a content of $FSO_3Li$ ranging from 0 to 500 ppm, preferably ranging from 0 to 300 ppm, advantageously ranging from 0 to 200 ppm, even more advantageously ranging from 0 to 100 ppm and in particular ranging from 0 to 20 ppm by weight relative to the total weight of said composition; and/or a content of $FSO_2NH_2$ ranging from 0 to 200 ppm, preferably ranging from 0 to 100 ppm, advantageously ranging from 0 to 50 ppm, even more advantageously ranging from 0 to 20 ppm and in particular ranging from 0 to 10 ppm by weight relative to the total weight of said composition.

According to one embodiment, the composition comprises:

$Cl^-$ ions in a content ranging from 0.1 to 20 ppm by weight, preferably from 0.1 to 15 ppm and even more advantageously from 0.1 to 10 ppm by weight relative to the total weight of said composition; and/or a content of $F^-$ ranging from 0.1 to 200 ppm, preferably ranging from 0.1 to 50 ppm and advantageously ranging from 0.1 to 30 ppm by weight relative to the total weight of said composition; and/or a content of $H_2O$ ranging from 0.1 to 200 ppm, preferably ranging from 0.1 to 100 ppm, advantageously ranging from 0.1 to 50 ppm, even more advantageously from 0.1 to 30 ppm by weight relative to the total weight of said composition; and/or a content of $SO_4^{2-}$ ranging from 0.1 to 300 ppm, preferably ranging from 0.1 to 200 ppm, advantageously ranging from 0.1 to 100 ppm, even more advantageously ranging from 0.1 to 50 ppm by weight relative to the total weight of said composition; and/or a content of $Na^+$ ranging from 0.1 to 200 ppm, preferably ranging from 0.1 to 100 ppm, advantageously ranging from 0.1 to 50 ppm and even more advantageously ranging from 0.1 to 20 ppm by weight relative to the total weight of said composition; and/or a content of $FSO_3Li$ ranging from 0.1 to 500 ppm, preferably ranging from 0.1 to 300 ppm, advantageously ranging from 0.1 to 200 ppm, even more advantageously ranging from 0.1 to 100 ppm and in particular ranging from 0.1 to 20 ppm by weight relative to the total weight of said composition; and/or a content of $FSO_2NH_2$ ranging from 0.1 to 200 ppm, preferably ranging from 0.1 to 100 ppm, advantageously ranging from 0.1 to 50 ppm, even more advantageously ranging from 0.1 to 20 ppm and in particular ranging from 0.1 to 10 ppm by weight relative to the total weight of said composition.

The composition may also comprise a content of butyl acetate of less than or equal to 2000 ppm, preferably less than or equal to 1500 ppm, preferentially less than or equal to 1000 ppm, advantageously less than or equal to 500 ppm, even more advantageously less than or equal to 250 ppm, for example less than or equal to 150 ppm.

Preferably, the composition according to the invention is characterized in that the sum of the total contents of acetic acid and of butyl acetate is less than or equal to 2200 ppm, preferably less than or equal to 1700 ppm, advantageously less than or equal to 1200 ppm, relative to the total weight of the composition. In particular, the composition is such that:

$$0.1 \text{ ppm} \leq [\text{acetic acid}] + [\text{butyl acetate}] \leq 1500 \text{ ppm},$$

and preferentially:

$$0.1 \text{ ppm} \leq [\text{acetic acid}] + [\text{butyl acetate}] \leq 1000 \text{ ppm}.$$

The composition may also comprise a content of butanol of less than or equal to 500 ppm, preferably less than or equal to 300 ppm, preferentially less than or equal to 200 ppm, advantageously less than or equal to 100 ppm, in particular less than or equal to 50 ppm, relative to the total weight of the composition.

The composition may also comprise a content of crystallization solvent, preferably chosen from chlorinated solvents and aromatic solvents, of less than or equal to 1000 ppm, preferably less than or equal to 800 ppm, preferentially less than or equal to 500 ppm, advantageously less than or equal to 200 ppm, in particular less than or equal to 100 ppm relative to the total weight of the composition.

In the context of the invention, the term "crystallization solvent" means the solvent which may be used to crystallize the lithium salt of bis(fluorosulfonyl)imide. This solvent is preferably dichloromethane or toluene.

Preferably, the composition according to the invention is characterized in that the sum of the total contents of acetic acid and of water is less than or equal to 400 ppm, preferably less than or equal to 300 ppm, advantageously less than or equal to 250 ppm, relative to the total weight of the composition. In particular, the composition is such that:

$$0.1 \text{ ppm} \leq [\text{acetic acid}] + [\text{water}] \leq 150 \text{ ppm},$$

and preferentially:

$$0.1 \text{ ppm} \leq [\text{acetic acid}] + [\text{water}] \leq 100 \text{ ppm}.$$

The amount of acetic acid and/or of butyl acetate and/or of butanol and/or of crystallization solvent is determined by proton NMR with an internal standard: trifluorotoluene.

The composition according to the invention may be obtained via a process comprising the following steps:
  a) step of preconcentrating a composition C1 comprising an organic solvent OS1, water and bis(fluorosulfonyl)imide salt, to give a composition C2 comprising:
    the lithium salt of bis(fluorosulfonyl)imide in a content ranging from 35% to 50%, preferably from 40% to 45% by weight relative to the total weight of composition C2;
    water in a mass content of less than or equal to 500 ppm, preferably less than or equal to 300 ppm, advantageously less than or equal to 100 ppm relative to the total mass of composition C2;
    said preconcentration step being performed at a temperature of less than or equal to 50° C.;
  b) a step of concentrating composition C2;
  c) an optional step of crystallizing the composition obtained in step b).

The lithium salt of bis(fluorosulfonyl)imide of composition C1 may be obtained via any known process for preparing said salt, for example as described in WO 2015/158979 or WO 2009/1233328.

Composition C1 may be obtained via any known process for preparing the lithium salt of bis(fluorosulfonyl)imide.

Composition C1 may also be obtained via a process comprising the following steps:
   i) process for preparing the lithium salt of bis(fluorosulfonyl)imide, said salt possibly being solid or in solution in an organic solvent OS2;
   ii) step of placing in contact with an organic solvent OS2 in the case where the salt LiFSI obtained in step i) is solid;
   iii) liquid-liquid extraction of said salt using the solution containing the organic solvent OS2 and the salt, with deionized water to form an aqueous solution of said salt of bis(fluorosulfonyl)imide;
   iv) optional step of concentrating said aqueous solution;
   v) liquid-liquid extraction of the salt of bis(fluorosulfonyl)imide using the aqueous solution with an organic solvent OS1, to recover composition C1.

Preferably, composition C1 comprises:
   a mass content of water ranging from 0.1% to 10%, preferentially from 1% to 10%, advantageously from 1.5% to 10% by weight relative to the total weight of said composition C1; and/or
   a mass content of the salt of bis(fluorosulfonyl)imide ranging from 5% to 30%, preferably from 5% to 20% by mass relative to the total mass of the composition.

The abovementioned organic solvent OS2 may be chosen from the group constituted of esters, nitriles, ethers, chlorinated solvents and aromatic solvents, and mixtures thereof. Preferably, the solvent OS2 is chosen from dichloromethane, ethyl acetate, butyl acetate, tetrahydrofuran, acetonitrile and diethyl ether, and mixtures thereof. Preferably, the organic solvent OS2 is butyl acetate.

According to the invention, the abovementioned step iii) may be repeated at least once.

According to one embodiment, the organic solvent OS1 is chosen from the group constituted of esters, nitriles, ethers, chlorinated solvents and aromatic solvents, and mixtures thereof. Preferably, the solvent OS1 is chosen from ethers and esters, and mixtures thereof. For example, mention may be made of methyl t-butyl ether, cyclopentyl methyl ether, ethyl acetate, propyl acetate, butyl acetate, dichloromethane, tetrahydrofuran, acetonitrile and diethyl ether, and mixtures thereof. Preferably, the solvent OS1 is chosen from methyl t-butyl ether, cyclopentyl methyl ether, ethyl acetate, propyl acetate and butyl acetate, and mixtures thereof, the organic solvent OS2 preferentially being butyl acetate.

The preconcentration step a) is preferably performed at a temperature ranging from 25° C. to 45° C., preferably from 30° C. to 40° C.

Preferably, the preconcentration step a) is performed under reduced pressure, for example at a pressure of less than or equal to 50 mbar abs, in particular at a pressure of less than or equal to 30 mbar abs.

The preconcentration step a) may be performed by any concentrating means, for example using an evaporator.

Preferably, the abovementioned step b) is performed in a short-path thin-film evaporator, under the following conditions:
   temperature of between 30° C. and 95° C., preferably between 30° C. and 90° C., preferentially between 40° C. and 85° C., in particular between 60° C. and 80° C.,
   pressure of between $10^{-3}$ mbar abs and 5 mbar abs, in particular between $5 \times 10^{-1}$ and 2 mbar abs,
   residence time of less than or equal to 5 min, preferably less than or equal to 3 min.

In the context of the invention, and unless otherwise mentioned, the term "residence time" means the time which elapses between the entry of the solution of lithium bis(fluorosulfonyl)imide salt (in particular obtained on conclusion of the abovementioned step b)) into the evaporator and the exit of the first drop of the solution.

According to a preferred embodiment, the temperature of the condenser of the short-path thin-film evaporator is between −50° C. and 5° C., preferably between −35° C. and 5° C. In particular, the condenser temperature is −5° C.

The short-path thin-film evaporators according to the invention are also known as "wiped-film short-path" (WFSP) evaporators. They are typically referred to as such since the vapors generated during the evaporation cover a short path (travel a short distance) before being condensed in the condenser.

Among the short-path thin-film evaporators, mention may notably be made of the evaporators sold by the companies Buss SMS Ganzler ex Luwa AG, UIC GmbH or VTA Process.

Typically, the short-path thin-film evaporators may comprise a condenser for the solvent vapors placed inside the machine itself (in particular at the center of the machine), unlike other types of thin-film evaporator (which are not short-path evaporators) in which the condenser is outside the machine.

In this type of machine, the formation of a thin film, of product to be distilled, on the hot inner wall of the evaporator may typically be ensured by continuous spreading over the evaporation surface with the aid of mechanical means specified below.

The evaporator may notably be equipped, at its center, with an axial rotor on which are mounted the mechanical means that allow the formation of the film on the wall. They may be rotors equipped with fixed vanes, lobed rotors with three or four vanes made of flexible or rigid materials, distributed over the entire height of the rotor, or rotors equipped with mobile vanes, paddles, doctor blades or guided scrapers. In this case, the rotor may be constituted by a succession of pivot-articulated paddles mounted on a shaft or axle by means of radial supports. Other rotors may be equipped with mobile rollers mounted on secondary axles and said rollers are held tight against the wall by centrifugation. The spin speed of the rotor, which depends on the size of the machine, may be readily determined by a person skilled in the art. The various spindles may be made of various materials: metallic, for example steel, steel alloy (stainless steel), aluminum, or polymeric, for example polytetrafluoroethylene PTFE, or glass materials (enamel); metallic materials coated with polymeric materials.

According to one embodiment, the solution is introduced into the short-path thin-film evaporator with a flow rate of between 700 g/h and 1200 g/h, preferably between 900 g/h and 1100 g/h for an evaporation area of 0.04 m².

According to one embodiment, the abovementioned process also comprises a step c) of crystallization of the lithium bis(fluorosulfonyl)imide salt obtained on conclusion of the abovementioned step b).

The crystallization step may be performed in an organic solvent ("crystallization solvent") chosen from chlorinated solvents, for instance dichloromethane, and aromatic solvents, for instance toluene.

Preferably, the LiFSI composition obtained on conclusion of step c) is recovered by filtration.

Preferably, the crystallization is performed at a temperature of less than or equal to 25° C., preferentially less than or equal to 15° C.

The solvents of ester type used for preparing the lithium salt of bis(fluorosulfonyl)imide may be hydrolyzed (in the presence of water) to decomposition products: acid and alcohol. Butyl acetate may notably be hydrolyzed to acetic acid and butanol. The inventors have discovered that a high content of acetic acid may harm the performance of the battery. Thus, the process according to the invention advantageously makes it possible to reduce, or even to prevent, the partial decomposition of the organic solvents used, for instance butyl acetate to acetic acid and/or butanol.

The composition according to the invention advantageously gives improved performance in batteries. In particular, the composition according to the invention has at least one of the following advantages:
- the corrosion of the aluminum current collector is advantageously reduced and/or zero;
- improved service life of the battery;
- improved battery performance.

The present invention also relates to the use of the composition according to the invention in batteries, notably in Li-ion batteries.

In particular, the composition according to the invention may be used in Li-ion batteries of mobile devices (for example cellphones, cameras, tablets or laptop computers), or electric vehicles, or for storing renewable energy (such as photovoltaic or wind energy).

In the context of the invention, the term "between x and y" or "ranging from x to y" means a range in which the limits x and y are included. For example, the temperature "between 30 and 100° C." notably includes the values 30° C. and 100° C.

All the embodiments described above may be combined with each other.

The present invention is illustrated by the example which follows, to which it is not, however, limited.

EXPERIMENTAL SECTION

Content of Residual Solvents: Headspace Method
Equipment: Agilent 6890
Chromatographic headspace system: Agilent 6890
HP-5 column length: 30 m, inside diameter 0.32 mm, active phase thickness: 0.25 μm Chromatographic conditions: oven at 60° C. for 2 minutes then ramp of 30° C./minute up to 300° C. and then maintenance at 300° C. for 2 minutes.
Injector: 250° C.
FID detector at 300° C.
Headspace conditions: 80° C. for 30 minutes
Sampling: 0.05 g of LiFSI dissolved in 200 ml of aqueous dimethyl sulfoxide DMSO solution: DMSO/ultra-pure water: 20/80 by volume. 2 ml of aqueous NaCl solution (20% by mass) are then added. The solution obtained is then transferred into a vial, which is sealed.
Quantification:
Calibration was performed using pure products. The detection limits were evaluated:
Butyl acetate=0.01% by weight
1-Butanol=0.01% by weight
Dichloromethane=0.01% by weight
Toluene=0.05% by weight
Acetic acid=5% by weight
The acetic acid detection limit is particularly high.
Content of residual solvents: NMR method:
The 1H NMR analysis conditions are as follows:
Equipment: The NMR spectra and quantifications were performed on a Brüker AV 400 spectrometer, at t 376.47 MHz for $^{19}F$, on a 5 mm probe of $BBFO^+$ type.

Sampling:
The LiFSI samples are dissolved in DMSO-d6 (about 30 mg in 0.6 ml).
Quantification:
The absolute quantification in $^{19}F$ NMR and proton NMR is performed by dosed addition of α,α,α-trifluorotoluene (TFT, Aldrich) to the tube containing the sample. The signals for the fluorinated species to be assayed are integrated in comparison with that of the $CF_3$ of this internal standard, according to the method that is well known to those skilled in the art. In proton NMR, the quantification is performed in a similar manner relative to the signal for the aromatic protons of the trifluorotoluene. The quantification limit of a species is of the order of a 50th of a ppm.

Example 1

A solution of 134 g of LiFSI in 823 g of butyl acetate (which may be obtained, for example, according to the process described in WO 2015/158979). The LiFSI concentration is approximately 10% by weight and the water content of this solution is 3% by weight. The water content of this solution is higher than the solubility of water in butyl acetate due to the association of the lithium salt with water. A first concentration by evaporation of the solvent is performed with a rotary evaporator at 40° C. under reduced pressure (P<30 mbar). A solution with a solids content of 42% and a water content, measured by titration, of 430 ppm by weight is obtained. The final concentration is performed in a WFSP (wiped-film short-path) evaporation machine at a temperature of 80° C. under a vacuum of 0.5 mbar. This concentrate is taken up in dichloromethane. The LiFSI crystallizes rapidly. After a contact time of 1 hour, solid LiFSI is obtained and is recovered by filtration and dried under vacuum for at least 24 hours. The mass of solid LiFSI is 110 g, i.e. a yield of 82%.

The analysis of the residual solvents in the LiFSI obtained is as follows:

| Weight %        | Headspace method | NMR method   |
| --------------- | ---------------- | ------------ |
| Butyl acetate   | 0.12             | 0.15         |
| Dichloromethane | 0.07             | 0.07         |
| Acetic acid     | Not detected     | Not detected |
| Butanol         | Not detected     | Not detected |

Example 2 (Comparative)

A solution of 53 g of LiFSI in 640 g of butyl acetate (obtained, for example, according to the process described in WO 2015/158979). The water content is 3.2% by weight. The solution is evaporated under vacuum at 70° C. A solution with a solids content of 40% and a water content of 1050 ppm by weight is obtained. The final concentration is performed in a WFSP (wiped-film short-path) evaporation machine at a temperature of 80° C. under a vacuum of 0.5 mbar. The concentrate is taken up in dichloromethane. The LiFSI crystallizes rapidly. After a contact time of 1 hour, 44 g of LiFSI are obtained and are recovered by filtration and dried under vacuum for at least 24 hours.

The residual solvent analysis is given below:

| Weight % | Headspace | NMR |
|---|---|---|
| Butyl acetate | 0.15 | 0.16 |
| Dichloromethane | 0.07 | 0.07 |
| Acetic acid | Not detected | 0.055 |
| Butanol | Not detected | Not detected |

The headspace measurement method by gas chromatography introduces a bias in the quantification of the organic species since the measurement is directly linked to the liquid/vapor equilibria of the system (underestimated results). The NMR assay method is more reliable since it is a direct measurement of the composition, and it has a lower detection limit than the headspace method.

Example 3: Chronoamperometry and Cyclic Voltammetry Tests

The electrolyte solutions No. 1 and No. 2 are prepared by dissolving the LiFSI prepared according to the preceding Examples 1 and 2 in a 3/7 by volume ethylene carbonate/ethyl methyl carbonate mixture. The LiFSI concentration is 0.8 mol/l. Furthermore, 2% by weight of fluoroethylene carbonate is added to each electrolyte.

Cyclic voltammetry test: The cyclic voltammetry tests are performed on button cells with a lithium metal anode and an aluminum cathode with the prepared electrolyte. The voltage is varied between 0 and 6 V with a sweep speed of 1 mV/s over three cycles. The current obtained on the third cycle, thus after the possible formation of the passivation layer, is noted.

The table below presents the results:

| Measurement voltage | Electrolyte No. 1 (with the LiFSI obtained in Example 1) | Electrolyte No. 2 (with the LiFSI obtained in Example 2) |
|---|---|---|
| 4.2 V | 29 µA | 154 µA |
| 4.5 V | 1034 µA | 1948 µA |
| 5 V | 543 µA | 933 µA |

It is observed that electrolyte No. 2 leads to a current having a higher intensity than that obtained with electrolyte No. 1. The current with a higher intensity (electrolyte No. 2) indicates greater corrosion of the aluminum.

Chronoamperometry:

This test consists in imposing a constant voltage to a battery of the same type as that described for the cyclic voltammetry test and in monitoring the current intensity across the cell. The objective is to measure the leakage current, residual current of constant intensity, which reflects the polarization of the battery and thus its service life. The greater the leakage current, the shorter will be the service life of the battery. The test was performed at 4 V.

For the cell prepared with the LiFSI of Example 1, the leakage current is 3.1 pA. The leakage current for the cell manufactured with the LiFSI of Example 2 is 15 pA.

These two tests show that electrolyte No. 2 prepared with an LiFSI containing 550 ppm of acetic acid has degraded performance relative to electrolyte No. 1 prepared with the LiFSI of Example 1.

The invention claimed is:

1. A composition comprising:
   at least 99.75% by weight of a lithium salt of bis(fluorosulfonyl)imide;
   acetic acid in a mass content greater than 0 and less than or equal to 400 ppm; and at least one of:
   butyl acetate in a mass content ranging from greater than 0 to less than or equal to 2000 ppm,
   $Cl^-$ ions in a mass content ranging from greater than 0 to less than or equal to 20 ppm, or
   $SO_4^{2-}$ ions in a mass content ranging from greater than 0 to less than or equal to 300 ppm.

2. The composition as claimed in claim 1, comprising at least 99.78% by weight of the lithium salt of bis(fluorosulfonyl)imide relative to the total weight of said composition.

3. The composition as claimed in claim 1, comprising at least 99.95% by weight of the lithium salt of bis(fluorosulfonyl)imide relative to the total weight of said composition.

4. The composition as claimed in claim 1, in which the mass content of acetic acid is less than or equal to 350 ppm relative to the total weight of the composition.

5. The composition as claimed in claim 1, in which the mass content of acetic acid ranges from 0.1 ppm to 300 ppm relative to the total weight of the composition.

6. The composition as claimed in claim 1, further comprising:
   a content of $F^-$ ions ranging from 0 to 200 ppm relative to the total weight of said composition; and/or
   a content of $H_2O$ ranging from 0 to 200 ppm by weight relative to the total weight of said composition; and/or
   a content of $Na^+$ ions ranging from 0 to 200 ppm by weight relative to the total weight of said composition; and/or
   a content of $FSO_3Li$ ranging from 0 to 500 ppm by weight relative to the total weight of said composition; and/or
   a content of $FSO_2NH_2$ ranging from 0 to 200 ppm by weight relative to the total weight of said composition.

7. The composition as claimed in claim 1, comprising a content of butyl acetate from greater than 0 to less than or equal to 2000 ppm.

8. The composition as claimed in claim 1, wherein the sum of the total contents of acetic acid and of butyl acetate is less than or equal to 2200 ppm relative to the total weight of the composition.

9. The composition as claimed in claim 1, comprising a content of butanol of less than or equal to 500 ppm relative to the total weight of the composition.

10. The composition as claimed in claim 1, comprising a content of crystallization solvent of less than or equal to 1000 ppm relative to the total weight of the composition.

11. The composition as claimed in claim 1, wherein the sum of the total contents of acetic acid and of water is less than or equal to 400 ppm relative to the total weight of the composition.

12. A process for preparing a composition as claimed in claim 1, comprising the following steps:
   a) preconcentrating a composition C1 comprising an organic solvent OS1, water and bis(fluorosulfonyl)imide salt, to give a composition C2 comprising:
   the lithium salt of bis(fluorosulfonyl)imide in a content ranging from 35% to 50% relative to the total weight of composition C2;
   water in a mass content of less than or equal to 500 ppm relative to the total mass of composition C2;

said preconcentration step being performed at a temperature of less than or equal to 50° C.;
b) concentrating composition C2;
c) optionally crystallizing the composition obtained in step b).

13. The process as claimed in claim 12, wherein composition C1 comprises:
   a mass content of water ranging from 0.1% to 10% relative to the total weight of said composition C1; and/or
   a mass content of the lithium salt of bis(fluorosulfonyl)imide ranging from 5% to 30% by mass relative to the total mass of the composition.

14. The process as claimed in claim 12, wherein the organic solvent OS1 is chosen from the group consisting of esters, nitriles, ethers, chlorinated solvents, aromatic solvents, and mixtures thereof.

15. The process as claimed in claim 12, in which the preconcentration step a) is performed under reduced pressure.

16. The process as claimed in claim 12, in which step b) is performed in a short-path thin-film evaporator, under the following conditions:
   a temperature of between 30° C. and 95° C.,
   a pressure of between $10^{-3}$ mbar abs and 5 mbar abs,
   a residence time of less than or equal to 5 min.

17. The composition as claimed in claim 1, wherein the composition is prepared from a process comprising a preconcentration step being performed at a temperature of less than or equal to 50° C.

18. The composition as claimed in claim 1, further comprising a crystallization solvent.

19. The composition of claim 1, wherein the sum of the total contents of acetic acid and of butyl acetate is greater than 0.1 ppm and less than or equal to 1500 ppm relative to the total weight of the composition.

20. The composition as claimed in claim 1, comprising $Cl^-$ ions in a mass content ranging from greater than 0 to less than or equal to 20 ppm.

21. The composition as claimed in claim 1, comprising $SO_4^{2-}$ ions in a mass content ranging from greater than 0 to less than or equal to 300 ppm.

* * * * *